United States Patent
Higashiyama

(10) Patent No.: US 6,523,361 B2
(45) Date of Patent: Feb. 25, 2003

(54) AIR CONDITIONING SYSTEMS

(75) Inventor: Akiyoshi Higashiyama, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/059,189

(22) Filed: Jan. 31, 2002

(65) Prior Publication Data

US 2002/0108384 A1 Aug. 15, 2002

(30) Foreign Application Priority Data

Feb. 15, 2001 (JP) ........................................ 2001-038618

(51) Int. Cl.[7] .............................. F25B 1/00; F25B 39/04
(52) U.S. Cl. ........................ 62/228.4; 62/183; 62/259.2
(58) Field of Search ............................. 62/228.4, 259.2, 62/228.1, 183

(56) References Cited

U.S. PATENT DOCUMENTS

| | | | |
|---|---|---|---|
| 4,720,981 A | * | 1/1988 | Helt et al. ..................... 62/113 |
| 5,678,761 A | | 10/1997 | Ikeda |
| 5,992,156 A | | 11/1999 | Isobe et al. |
| 6,016,966 A | | 1/2000 | Inoue |
| 6,341,494 B1 | | 1/2002 | Isobe et al. |
| 6,418,738 B1 | * | 7/2002 | Yamashita ................... 62/183 |
| 2002/0062656 A1 | * | 5/2002 | Suitou et al. .............. 62/259.2 |

FOREIGN PATENT DOCUMENTS

JP 10115448 6/1998

* cited by examiner

*Primary Examiner*—Denise L. Esquivel
*Assistant Examiner*—Marc Norman
(74) *Attorney, Agent, or Firm*—Baker Botts L.L.P.

(57) ABSTRACT

An air conditioning system includes a refrigerant circuit. The refrigerant circuit includes a compressor for receiving a refrigerant gas and for compressing the refrigerant gas, and a condenser for condensing a portion of the compressed refrigerant gas into a liquid refrigerant. The refrigerant circuit also includes an expansion valve for reducing a pressure of the condensed liquid refrigerant, and an evaporator for evaporating the condensed liquid refrigerant. Moreover, the compressor is driven by an electric motor which controls a rotational speed of the compressor via an inverter, and a temperature of the inverter is decreased by the refrigerant circuit. The system also includes an electric circuit for determining whether a temperature of the inverter is greater than a first predetermined temperature, and an electric circuit for controlling a rotational speed of the compressor. Specifically, when the temperature of the inverter is greater than the first predetermined temperature, the electric circuit decreases the rotational speed of the compressor.

26 Claims, 5 Drawing Sheets

AIR CONDITIONING SYSTEMS

BACKGROUND OF THE INVENTION

1. Field of the Invention

The present invention relates generally to the field of air conditioning systems. In particular, the present invention relates to air conditioning systems employing a refrigerant circuit to decrease a temperature of an inverter.

2. Description of Related Art

Known air conditioning systems may control the rotational speed of an operating compressor by controlling the rotational speed of an electric motor driving the compressor. Specifically, known air conditioning systems may control the rotational speed of the compressor via an inverter. Moreover, in order to prevent an air conditioning load from increasing beyond a predetermined level, the rotational speed of the electric motor may be decreased when the amount of electrical current flowing to the electric motor exceeds a predetermined amount of electrical current. As such, the amount of electrical current flowing to the electric motor generally may be maintained below the predetermined amount of electrical current, which may reduce damage to the inverter caused by excessive electrical current. Nevertheless, in such air conditioning systems, when the amount of electrical current flowing to the electric motor is greater than the predetermined amount of electrical current, the rotational speed of the motor will be decreased, which causes a cooling capacity of the refrigerant circuit to decrease.

Japanese Patent (Unexamined) Publication No. H10-115448 describes an air conditioning system that substantially maintains the cooling capacity of the refrigerant circuit, while also maintaining the amount of electrical current flowing to the electric motor below the predetermined amount of electrical current. In this air conditioning system, the amount of electrical current flowing to the electric motor, and the rotational speed of the electric motor, are correlated to a torque of the compressor, i.e., the load torque. When the amount of electrical current flowing to the electrical motor is a constant value, the torque of the compressor decreases and the rotational speed of the electric motor increases. Consequently, even when the amount of electrical current flowing to the electric motor decreases, the rotational speed of the electric motor may be maintained by decreasing the torque of the compressor.

Specifically, the foregoing air conditioning system may decrease the volume of air passing through an evaporator. Decreasing the volume of air passing through the evaporator may decrease the amount of electrical current flowing through the electric motor and also may increase the rotational speed of the electric motor. Moreover, increasing the rotational speed of the motor also decreases the torque of the compressor and maintains a substantially constant air conditioning system cooling capacity.

Nevertheless, in the foregoing air conditioning system, although the amount of electrical current flowing to the electric motor is maintained below the predetermined amount of electrical current, the amount of heat generated by the inverter may be greater than an amount of heat which is absorbed by the refrigeration circuit. Consequently, although the amount of electrical current flowing to the electric motor is maintained below the predetermined amount of electrical current, the inverter may be damaged.

SUMMARY OF THE INVENTION

Therefore, a need has arisen for air conditioning systems and methods of employing such air conditioning systems that overcome these and other shortcomings of the related art. A technical advantage of the present invention is that the rotational speed of a compressor may be reduced when the temperature of the inverter becomes greater than a first predetermined temperature. Moreover, a rotation of the compressor may be stopped when the temperature of the inverter becomes greater than a second predetermined temperature which is greater than the first predetermined temperature. Reducing the rotational speed of the compressor, or stopping the rotation of the compressor, or both, may reduce or eliminate damage to the inverter.

According to an embodiment of the present invention, an air conditioning system is described. The air conditioning system comprises a refrigerant circuit. The refrigerant circuit comprises a compressor for receiving a refrigerant gas and for compressing the refrigerant gas, and a condenser for condensing a portion of the compressed refrigerant gas into a liquid refrigerant. The refrigerant circuit also comprises an expansion valve for reducing a pressure of the condensed liquid refrigerant, and an evaporator for evaporating the condensed liquid refrigerant. Moreover, the compressor is driven by an electric motor which controls the rotational speed of the compressor via an inverter, and a temperature of the inverter is decreased by the refrigerant circuit. The system also comprises means for determining whether a temperature of the inverter is greater than a first predetermined temperature, e.g., an electric circuit, and means for controlling the rotational speed of the compressor, e.g., an electrical circuit. Specifically, when the temperature of the inverter is greater than the first predetermined temperature, the means for controlling the rotational speed of the compressor decreases the rotational speed of the compressor. In another embodiment, the inverter is formed integrally with the compressor.

According to another embodiment of the present invention, a method of employing an air conditioning system is described. The air conditioning system comprises a compressor for receiving a refrigerant gas and for compressing the refrigerant gas, and a condenser for condensing at least a portion of the compressed refrigerant gas into a liquid refrigerant. The air conditioning system also comprises an expansion valve for reducing a pressure of the condensed liquid refrigerant, and an evaporator for evaporating the condensed liquid refrigerant. Moreover, the compressor is driven by an electric motor, and the electric motor controls a rotational speed of the compressor by an inverter. The method comprises the steps of determining whether a temperature of the inverter is greater than a first predetermined temperature, and decreasing a rotational speed of the compressor when the temperature of the inverter is greater than the first predetermined temperature.

Other objects, features, and advantages of the present invention will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings

DETAILED DESCRIPTION OF PREFERRED EMBODIMENTS

Preferred embodiments of the present invention and their advantages may be understood by referring to FIGS. 1–7, like numerals being used for like corresponding parts in the various drawings.

Figure 1:
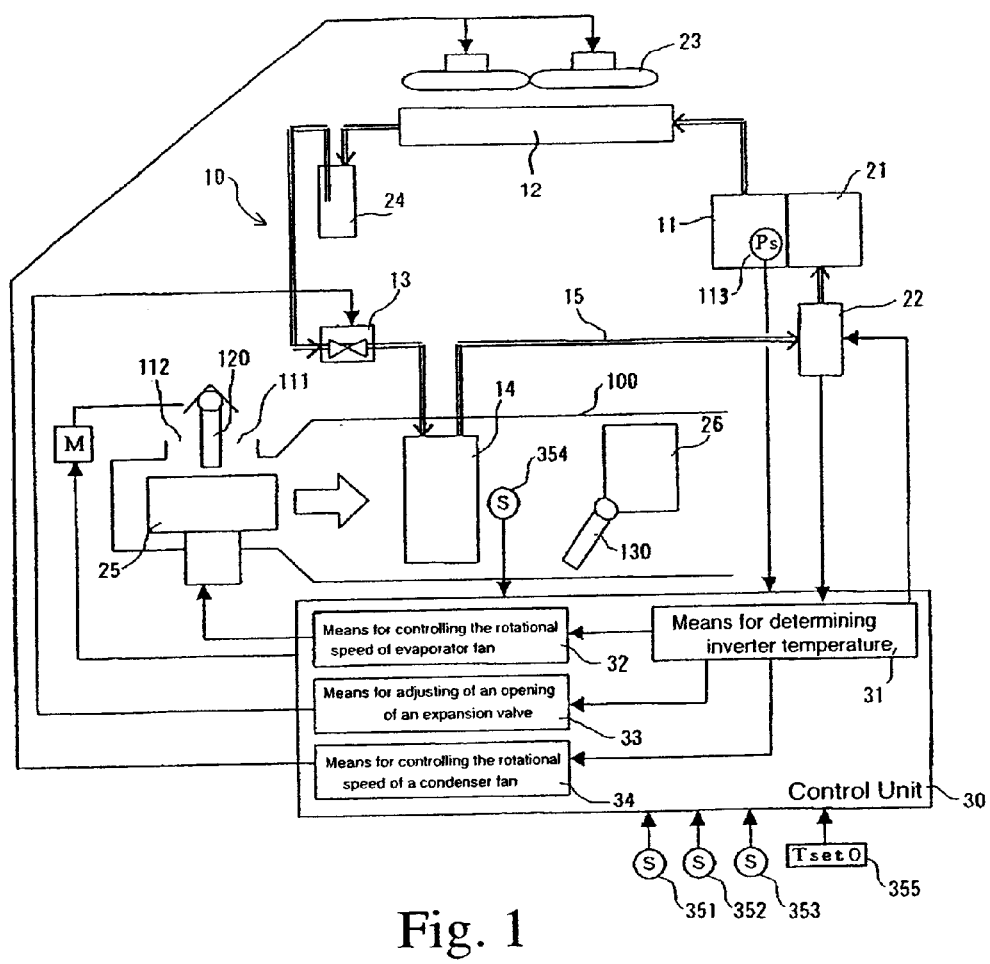
FIG. 1 is a schematic of an air conditioning system according to a first embodiment of the present invention.
Figure 2:
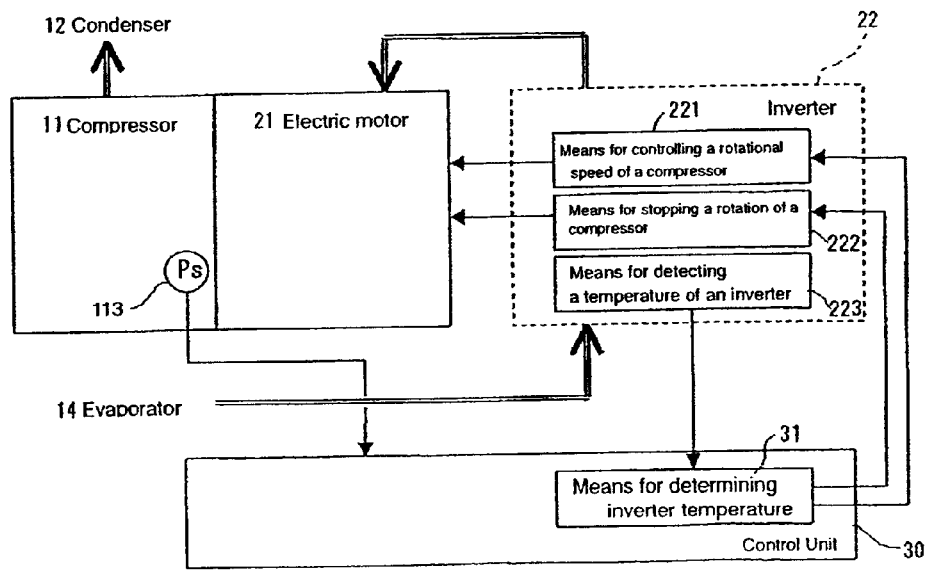
FIG. 2 is a schematic of a control unit 30 depicted in FIG. 1, according to the first embodiment of the present invention.

Referring to FIGS. 1 and 2, an air conditioning system according to a first embodiment of the present invention is described. The air conditioning system comprises an air conditioning unit 100, which forms a passage allowing air drawn inside air conditioning unit 100 to pass from the exterior of a vehicle (not shown), e.g., an automobile, into a passenger compartment (not shown) of the vehicle. Although the air conditioning system is described with respect to a vehicle, the air conditioning system may be employed in other environments, such as within a house, an office building, or the like. Air conditioning unit 100 comprises an evaporator fan 25. Evaporator fan 25 comprises a fan (not shown) and a fan motor (not shown). Air conditioning unit 100 also comprises an interior air inlet 111 and an exterior air inlet 112, and inlets 111 and 112 are formed on an upstream side of evaporator fan 25. Air conditioning unit 100 further comprises an interior-exterior air switching damper 120, which is driven by a driving means (not shown), e.g., a servo motor, and controls an opening and a closing of inlets 111 and 112. In operation, when switching damper 120 opens inlet 112 and closes inlet 111, evaporator fan 25 may draw air from the exterior of the vehicle into air conditioning unit 100 via inlet 112 (hereinafter "the exterior air mode"). Similarly, when switching damper 120 opens inlet 111 and closes inlet 112, evaporator fan 25 may draw air from the interior of the passenger compartment of the vehicle into air conditioning unit 100 via inlet 111 (hereinafter "the interior air mode").

Air conditioning unit 100 also may comprise a refrigerant circuit 10. Refrigerant circuit 10 comprises a compressor 11 e.g., a variable displacement-type compressor, a fixed displacement-type compressor, or the like; a condenser 12; a receiver 24; an expansion valve 13; and an evaporator 14. Compressor 11 may be connected to condenser 12, and condenser 12 may be connected to receiver 24. Receiver 24 may be connected to expansion valve 13, and expansion valve 13 may be connected to evaporator 14. Moreover, evaporator 14 may be connected to compressor 11, such that compressor 11, condenser 12, receiver 24, expansion valve 13, and evaporator 14 form a closed circuit. Further, each of the forgoing connections may be made via a refrigerant pipe 15. In operation, compressor 11 may receive refrigerant gas from evaporator 14 and also may compress the refrigerant gas. Compressing the refrigerant gas may increase a temperature of the refrigerant gas and also may increase a pressure of the refrigerant gas. Compressor 11 may pass the compressed refrigerant gas to condenser 12. When the compressed refrigerant gas flows through condenser 12, at least a portion of the refrigerant gas may turn into a liquid refrigerant. Moreover, condenser 12 may pass the condensed refrigerant to receiver 24, and receiver 24 may divide the condensed refrigerant into a liquid refrigerant portion and a refrigerant gas portion. Receiver 24 may pass the liquid refrigerant portion of the refrigerant to expansion valve 13, which may decrease the pressure of the liquid refrigerant. When expansion valve 13 reduces the pressure of the liquid refrigerant, expansion valve 13 may pass the refrigerant to evaporator 14, which may vaporize or evaporate the liquid refrigerant into a refrigerant gas, and the refrigerant gas may be passed to compressor 11. Nevertheless, the air conditioning system also may be employed as a heat-pump type air conditioning system by reversing the flow of refrigerant within refrigerant circuit 10. Specifically, in this embodiment, a temperature of air within air conditioning unit 100 increases when liquid refrigerant is condensed within condenser 12.

Controlling the rotational speed of compressor 11 may control a rate of the cooling of the passenger compartment of the vehicle. Compressor 11 may be driven by a motor, e.g., an electric motor 21, and the rotational speed of compressor 11 may be adjusted by controlling the input of electric current into electric motor 21. Moreover, an inverter 22 may control the input of electric current into electric motor 21. Inverter 22 may comprise means for controlling 221 the rotational speed of compressor 11, e.g., an electrical circuit included within inverter 22; means for stopping 222 the rotation of compressor 11, e.g., an electrical circuit included within inverter 22; and means for detecting 223 the temperature of inverter 22, e.g., a thermometer. In an embodiment, the means for controlling 221 and the means for stopping 222 may be different electrical circuits. In another embodiment, electric motor 21 may be formed integrally with compressor 11, and electric motor 21 and inverter 22 may be formed between evaporator 14 and compressor 11. Moreover, the means for controlling 221 the rotational speed of compressor 11, the means for stopping 222 the rotation of compressor 11, and the means for detecting 223 the temperature of inverter 22, or any combinations thereof, may be formed integrally with inverter 22. During operation, electric motor 21 and inverter 22 also may be cooled by the refrigerant evaporated by evaporator 14 when the evaporated refrigerant passes to compressor 11 via inverter 22 and electric motor 21.

Air conditioning unit 100 also may comprise a heater core 26 formed on a downstream side of evaporator 14, and an air mix damper 130 formed between the downstream side of evaporator 14 and an upstream side of heater core 26. Air mix damper 130 may be driven by a driving means (not shown), e.g., a servo motor. Moreover, the movement of air mix damper 130 may control a volume of air capable passing through heater core 26 via evaporator 14, which may control the air temperature within the passenger compartment of the vehicle.

The air conditioning system may be controlled by a control unit 30. Control unit 30 may comprise a processor and a memory, e.g., a random access memory, a read only memory, or the like, and may control the temperature within the passenger compartment based on various types of temperature information. A battery (not shown) within the vehicle may power control unit 30. The air conditioning system also may comprise an interior air sensor 351, which may detect the temperature within the passenger compartment, an exterior air sensor 352, which may detect the ambient temperature outside the vehicle, and a temperature setting apparatus 355, which may be formed on a control panel (not shown) inside the passenger compartment and allows a passenger to set or adjust the temperature within the passenger compartment. The air conditioning system also may comprise a coolant temperature sensor 353, which may detect a temperature of a coolant of a driving source of the vehicle, and a blow air temperature sensor 354, which may detect a temperature of air passing through evaporator 14. Sensors 351, 352, 353, and 354, along with apparatus 355, may be connected to an input side of control unit 30. Moreover, an output side of control unit 30 may be connected to evaporator fan 25.

Control unit 30 may comprise means for determining 31 whether the detected temperature of inverter 22 is greater than a predetermined temperature, e.g., an electric circuit. Control unit 30 also may comprise means for controlling 32 the rotational speed of evaporator fan 25, e.g., a governor or a controller comprising a drive circuit (not shown) including a variable resistor (not shown). Control unit 30 further may comprise means for adjusting 33 the size of an opening of expansion valve 13, e.g., a governor or a controller, and a means for controlling 34 the rotational speed of a condenser fan 23 formed adjacent to condenser 12, e.g., a governor or a controller. Moreover, in an embodiment, the means for controlling 221 the rotational speed of compressor 11, the means for stopping 222 the rotation of compressor 11, and the means for detecting 223 the temperature of inverter 22, or any combinations thereof, may be formed integrally with control unit 30.

In operation, the means for determining 31 may determine whether a temperature (T) of inverter 22 is greater than a first predetermined temperature ($T_1$). When temperature (T) of inverter 22 is greater than the first predetermined temperature ($T_1$), the means for controlling 221 may reduce the rotational speed of compressor 11. Moreover, the means for controlling 32 may reduce the rotational speed of evaporator fan 25, which may reduce a volume of air passing through evaporator 14. Further, the means for adjusting 33 may increase the size of the opening of expansion valve 13, and the means for controlling 34 may increase the rotational speed of the fan of condenser 12. In operation, the means for determining 31 also may determine whether the temperature (T) of inverter 22 is greater than a second predetermined temperature ($T_2$), which is greater than the first predetermined temperature ($T_1$). When temperature (T) of inverter 22 is greater than both the first predetermined temperature ($T_1$) and the second predetermined temperature ($T_2$), the means for stopping 222 may stop the rotation of compressor 11. Moreover, when during an initial start-up of compressor 11 temperature (T) of inverter 22 is greater than the first predetermined temperature ($T_1$), the means for controlling 221 may maintain the rotational speed of compressor 11 at a substantially reduced speed, i.e., an activation rotational speed. Specifically, the substantially reduced speed may be any speed sufficient to allow the temperature (T) of inverter 22 to decrease below the first predetermined temperature ($T_1$). Moreover, the rotational speed of compressor 11 may remain at the substantially reduced speed until the temperature (T) of inverter 22 decreases below the first predetermined temperature ($T_1$).

Figure 5:
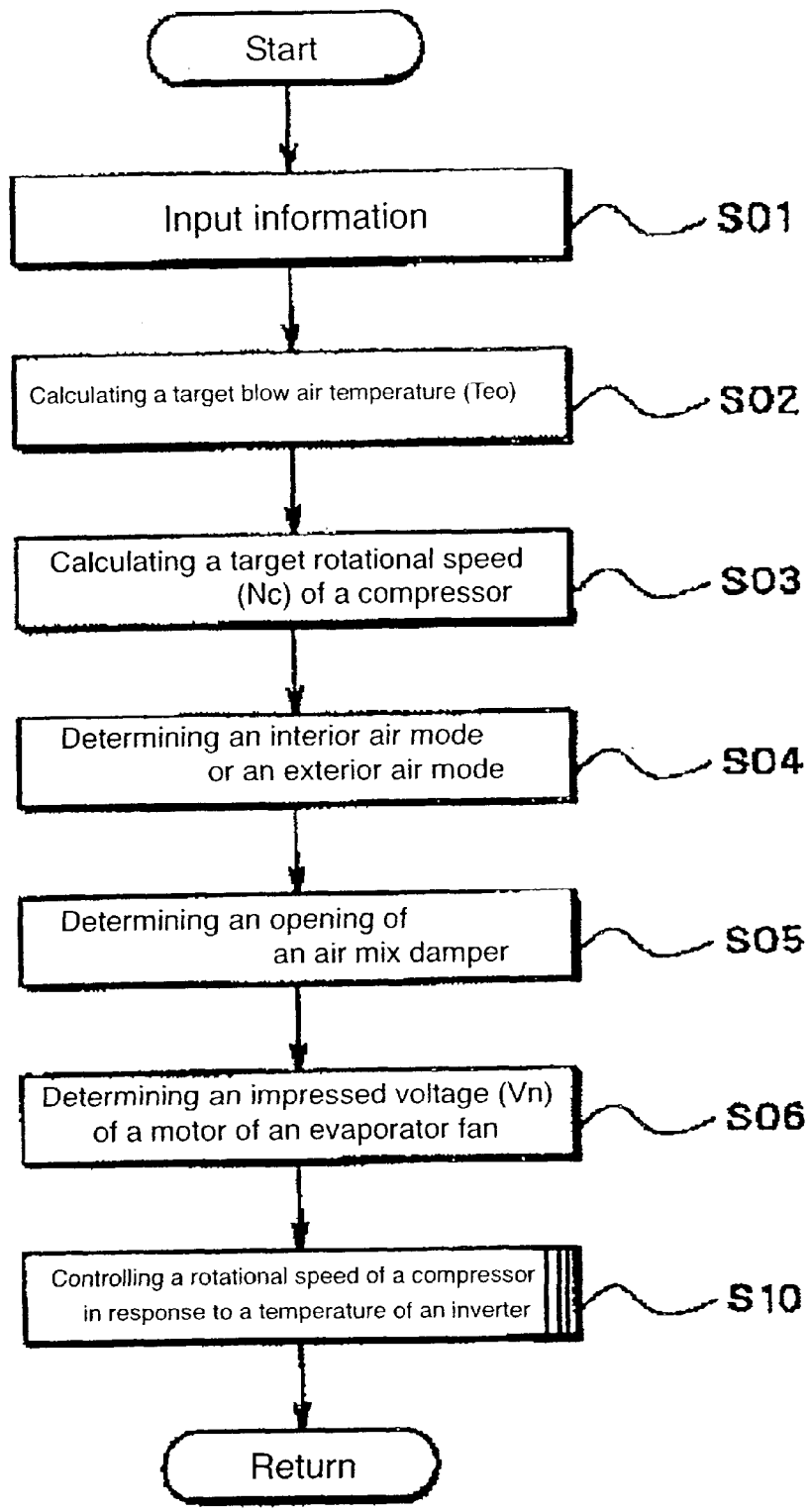
FIG. 5 is a flow chart showing an operation of the air conditioning system depicted in FIG. 1, according to the first embodiment of the present invention.

Referring to FIG. 5, an operation of the air conditioning system according to the first embodiment of the present invention is described. The operation depicted in FIG. 5 begins when a user turns on a key switch (not shown) of the vehicle. In step S01, temperature values sensed by interior air sensor 351, exterior air sensor 352, coolant temperature sensor 353, and blow air temperature sensor 354 are received at the input side of control unit 30. In step S01, the temperature value associated with temperature setting apparatus 355, i.e., the desired passenger compartment temperature set by the passenger, also is received at the input side of control unit 30. In step S02, based on the information received in step S01, control unit 30 calculates a target blow air temperature ($T_{eo}$) for air passing through evaporator 14. In step S03, based on the target blow air temperature ($T_{eo}$) calculated in step S02, control unit 30 calculates a target rotational speed ($N_c$) for compressor 11. Specifically, when the calculated target blow air temperature ($T_{eo}$) decreases, the calculated target rotational speed ($N_c$) for compressor 11 increases. In step S04, based on the calculated target rotational speed ($N_c$) for compressor 11, control unit 30 determines whether to apply the exterior air mode or whether to apply the interior air mode.

In step S05, based on the target blow air temperature ($T_{eo}$) for air passing through evaporator 14 and the temperature value sensed by coolant temperature sensor 353, control unit 30 determines whether to open air mix damper 130. Specifically, when the target blow air temperature ($T_{eo}$) is at about the lowest temperature within a predetermined range of target blow air temperatures, air mix damper 130 moves to a position such that air passing through evaporator 14 substantially or entirely bypasses heater core 26. In step S06, control unit 30 determines an impressed voltage ($V_n$) of the motor of evaporator fan 25. Moreover, as the target blow air temperature ($T_{eo}$) increases, the impressed voltage ($V_n$) increases. In step S10, the temperature (T) of inverter 22 is detected, and the rotational speed of compressor 11 is adjusted according to the following embodiments of the present invention.

Figure 6:
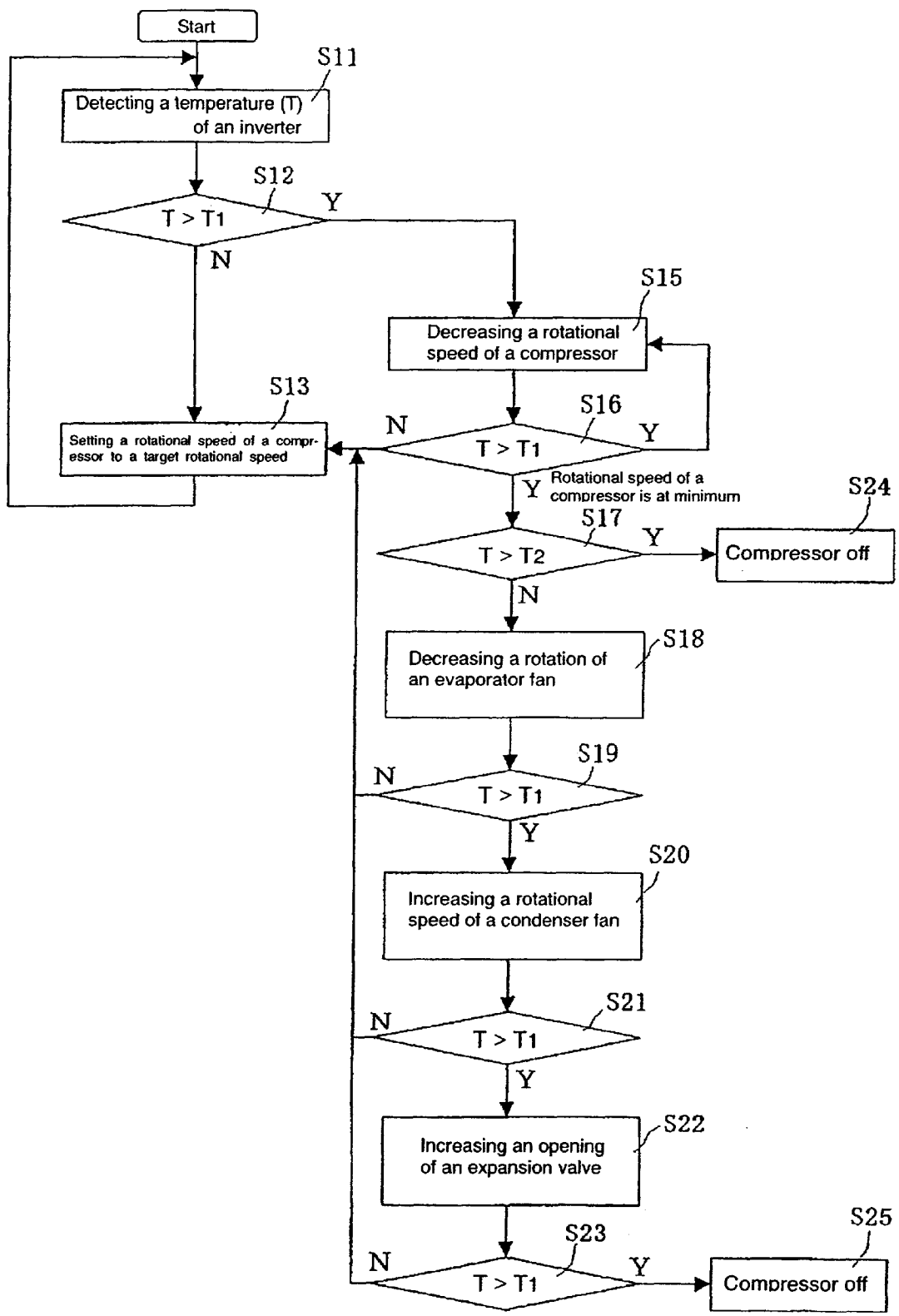
FIG. 6 is a flow chart showing a first operation of control unit 30 depicted in FIG. 2, according to the first embodiment of the present invention.

Referring to FIG. 6, a flow chart depicting an operation or a performance of step S10 according to the first embodiment is described. Step S10 may include steps S11–S25. In step S11, the means for determining 31 receives the temperature (T) of inverter 22 from the means for detecting 223 the temperature of inverter 22. In step S12, the means for determining 31 determines whether the temperature (T) of inverter 22 is greater than the first predetermined temperature ($T_1$). When the temperature (T) of inverter 22 is less than or equal to the first predetermined temperature ($T_1$), step 510 proceeds to step S 13. Nevertheless, when the temperature (T) of inverter 22 is greater than the first predetermined temperature ($T_1$), step S10 proceeds to step S15.

In step S13, when the temperature (T) of inverter 22 is less than or equal to the first predetermined temperature ($T_1$), the means for controlling 221 adjusts the rotational speed of compressor 11 to be equal to the target rotational speed ($N_c$) for compressor 11. Moreover, upon completion of step S13, step S10 returns to step S11.

In step S15, when the temperature (T) of inverter 22 is greater than the first predetermined temperature ($T_1$), the means for controlling 221 decreases the rotational speed of compressor 11, and step S10 proceeds to step S16. In step S16, the means for determining 31 receives the temperature (T) of inverter 22 from the means for detecting 223 the temperature of inverter 22, and also determines whether the temperature (T) of inverter 22 is greater than the first predetermined temperature ($T_1$). When the temperature (T) of inverter 22 is less than or equal to the first predetermined temperature ($T_1$), step S10 proceeds to step S13. Nevertheless, when the temperature (T) of inverter 22 is greater than the first predetermined temperature ($T_1$), step S10 returns to step S15. Moreover, when the temperature (T) of inverter 22 is greater than the first predetermined temperature ($T_1$), and when the rotational speed of compressor 11 is less than or equal to a predetermined minimum compressor speed, step S10 also proceeds to step S17.

In step S17, the means for determining 31 receives the temperature (T) of inverter 22 from the means for detecting 223 the temperature of inverter 22, and determines whether the temperature (T) of inverter 22 also is greater than the second predetermined temperature ($T_2$). When the temperature (T) of inverter 22 is less than or equal to the second predetermined temperature ($T_2$), step S10 proceeds to step S18. Nevertheless, when the temperature (T) of inverter 22 is greater than the second predetermined temperature ($T_2$), step S10 proceeds to step S24, and the means for stopping 222 stops the rotation of compressor 11.

In step S18, the means for controlling 32 may decrease the rotational speed of evaporator fan 25. In step S19, the means for determining 31 receives the temperature (T) of inverter 22 from the means for detecting 223 the temperature of inverter 22, and also determines whether the temperature (T) of inverter 22 is greater than the first predetermined temperature ($T_1$). When the temperature (T) of inverter 22 is less than or equal to the first predetermined temperature ($T_1$), step S10 proceeds to step S13. Nevertheless, when the temperature (T) of inverter 22 is greater than the first predetermined temperature ($T_1$), step S10 proceeds to step S20.

In step S20, the means for controlling 34 may increase the rotational speed of condenser fan 23, and step S10 proceeds to step S21. In step S21, the means for determining 31 receives the temperature (T) of inverter 22 from the means for detecting 223 the temperature of inverter 22, and also determines whether the temperature (T) of inverter 22 is greater than the first predetermined temperature ($T_1$). When the temperature (T) of inverter 22 is less than or equal to the first predetermined temperature ($T_1$), step S10 proceeds to step S13. Nevertheless, when the temperature (T) of inverter 22 is greater than the first predetermined temperature ($T_1$), step S10 proceeds to step S22. In step 22, the means for adjusting 33 increases the size of the opening of expansion valve 13, and step S10 proceeds to step S23.

In step S23, the means for determining 31 receives the temperature (T) of inverter 22 from the means for detecting 223 the temperature of inverter 22, and also determines whether the temperature (T) of inverter 22 is greater than the first predetermined temperature ($T_1$). When the temperature (T) of inverter 22 is less than or equal to the first predetermined temperature ($T_1$), step S10 proceeds to step S13. Nevertheless, when the temperature (T) of inverter 22 is greater than the first predetermined temperature ($T_1$), step S10 proceeds to step S25, and the means for stopping 222 stops the rotation of compressor 11.

In an embodiment, when during an initial start-up of compressor 11 the means for determining 31 determines that the temperature (T) of inverter 22 is greater than the first predetermined temperature ($T_1$), the rotational speed of compressor 11 may be maintained at a substantially reduced speed, i.e., an activation rotational speed. Specifically, the substantially reduced speed may be any speed sufficient to allow the temperature (T) of inverter 22 to decrease below the first predetermined temperature ($T_1$). Moreover, the rotational speed of compressor 11 may remain at the substantially reduced speed until the temperature (T) of inverter 22 decreases below the first predetermined temperature ($T_1$).

Figure 7:
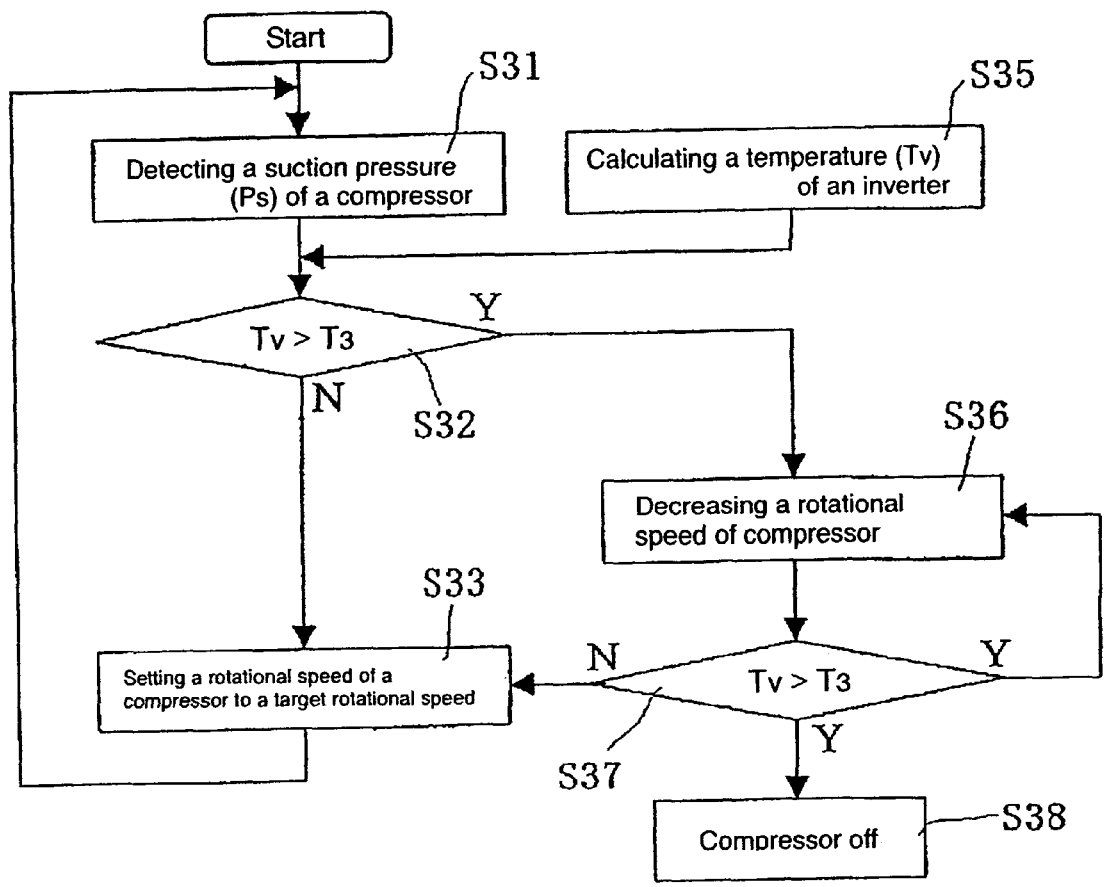
FIG. 7 is a flow chart showing a second operation of control unit 30 depicted in FIG. 2, according to the first embodiment of the present invention.

Referring to FIG. 7, in another embodiment of the present invention, compressor 11 also may comprise means for detecting 113 a suction pressure ($P_s$) of compressor 11, e.g., a pressure sensor. In this embodiment, step S10 may include steps S31–S38. In step S31, the means for detecting 113 detects a suction pressure of compressor 11, and in step S35, based on the detected suction pressure ($P_s$) of compressor 11, control unit 30 calculates a temperature ($T_v$) of inverter 22. When steps S31 and S35 are completed, in step S32, the means for determining 31 determines whether the calculated temperature ($T_v$) of inverter 22 is greater than a third predetermined temperature ($T_3$). When the calculated temperature ($T_v$) of inverter 22 is less than or equal to the third predetermined temperature ($T_3$), step S10 proceeds to step S33. Nevertheless, when the calculated temperature ($T_v$) of inverter 22 is greater than the third predetermined temperature ($T_3$), step S10 proceeds to step S36. In step S36, the means for controlling 221 the rotational speed of compressor 11 decreases the rotational speed of compressor 11.

In step S33, the means for controlling 221 adjusts the rotational speed of compressor 11 to be equal to the target rotational speed ($N_c$), and step S10 returns to step S31. In step S37, the means for determining 31 determines whether the calculated temperature ($T_v$) of inverter 22 is greater than the third predetermined temperature ($T_3$). When the calculated temperature ($T_v$) of inverter 22 is less than or equal to the third predetermined temperature ($T_3$), step S10 proceeds to step S33. Nevertheless, when the calculated temperature ($T_v$) of inverter 22 is greater than the third predetermined temperature ($T_3$), step S10 returns to step S36. Moreover, when the calculated temperature ($T_v$) of inverter 22 is greater than the third predetermined temperature ($T_3$), and when the rotational speed of compressor 11 is less than or equal to a predetermined minimum compressor speed, step S10 also proceeds to step S38. In step S38, the means for stopping 222 stops the rotation of compressor 11.

In any of the foregoing embodiments of the present invention, reducing the rotational speed of compressor 11 when the temperature (T), or the calculated temperature ($T_v$), is greater than the first predetermined temperature ($T_1$), or the third predetermined temperature ($T_3$), respectively, may reduce or eliminate damage to inverter 22. Similarly, stopping the rotation of compressor 11 when the temperature (T) is greater than the second predetermined temperature ($T_2$) also may reduce or eliminate damage to inverter 22.

Figure 3:
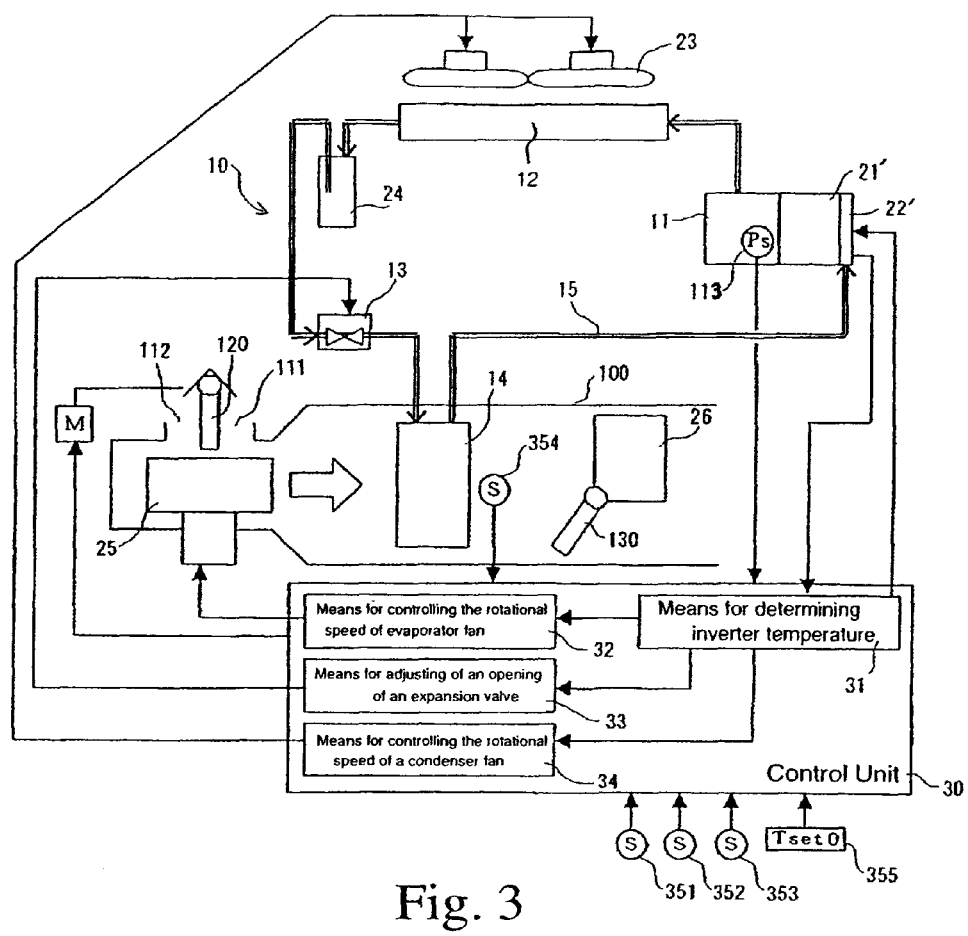
FIG. 3 is a schematic of an air conditioning system according to a second embodiment of the present invention.
Figure 4:
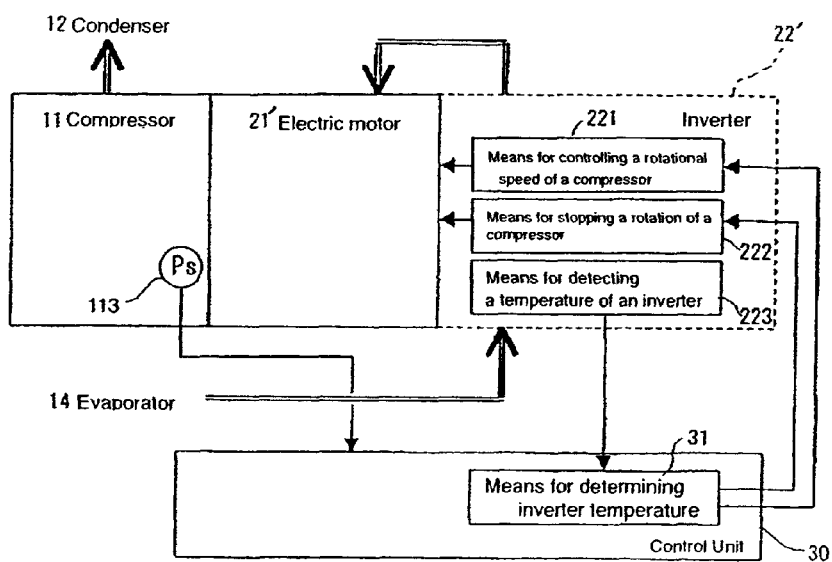
FIG. 4 is a schematic of a control unit 30 depicted in FIG. 3, according to the second embodiment of the present invention.

Referring to FIGS. 3 and 4, an air conditioning system according to a second embodiment of the present invention is described. The features and advantages of the second embodiment are substantially similar to those features and advantages of the foregoing embodiments. Therefore, features and advantages of the foregoing embodiments are not discussed again with respect to the second embodiment. In this embodiment, an inverter 22' may be formed integrally with an electric motor 21', and inverter 22' and electric motor 21' may be formed integrally with a compressor 11'.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. An air conditioning system comprising:
   a refrigerant circuit, wherein said refrigerant circuit comprises:

a compressor for receiving a refrigerant gas and for compressing said refrigerant gas;

a condenser for condensing at least a portion of said compressed refrigerant gas into a liquid refrigerant;

an expansion valve for reducing a pressure of said condensed liquid refrigerant; and an evaporator for evaporating said condensed liquid refrigerant, wherein said compressor is driven by an electric motor and said electric motor controls a rotational speed of said compressor by an inverter, wherein a temperature of said inverter is decreased by said evaporated refrigerant;

means for determining whether a temperature of said inverter is greater than a first predetermined temperature; and means for controlling a rotational speed of said compressor, such that when said temperature of said inverter is greater than said first predetermined temperature, said means for controlling said rotational speed of said compressor decreases said rotational speed of said compressor.

2. The air conditioning system of claim 1, wherein said means for controlling said rotational speed of said compressor comprises a first electric circuit and said means for determining comprises a second electric circuit.

3. The air conditioning system of claim 1, further comprising means for stopping a rotation of said compressor when said temperature of said inverter is greater than a second predetermined temperature, wherein said second predetermined temperature is greater than said first predetermined temperature.

4. The air conditioning system of claim 3, wherein said means for stopping comprises an electric circuit.

5. The air conditioning system of claim 1, wherein when after an activation of said compressor said temperature of said inverter is greater than said first predetermined temperature, said means for controlling substantially maintains said rotational speed of said compressor at an activation rotational speed, wherein rotating said compressor at said activation rotational speed decreases said temperature of said inverter below said first predetermined temperature.

6. The air conditioning system of claim 1, further comprising means for detecting a suction pressure of said compressor, wherein when a calculated temperature of said inverter is greater than a third predetermined temperature, said means for controlling said rotational speed of said compressor decreases said rotational speed of said compressor.

7. The air conditioning system of claim 6, wherein said means for detecting comprises a pressure sensor.

8. The air conditioning system of claim 1, further comprising means for controlling a volume of air passing through said evaporator, wherein when said temperature of said inverter is greater than said first predetermined temperature, said means for controlling said volume of air passing through said evaporator decreases said volume of air passing through said evaporator.

9. The air conditioning system of claim 8, wherein said evaporator comprises an evaporator fan and said means for controlling said volume of air comprises a first governor, wherein when said first governor reduces a rotational speed of said evaporator fan said volume of air passing through said evaporator decreases.

10. The air conditioning system of claim 1, further comprising means for adjusting a size of an opening of said expansion valve, wherein when said temperature of said inverter is greater than said first predetermined temperature, said means for adjusting said size of said opening increases said size of said opening.

11. The air conditioning system of claim 10, wherein said means for adjusting comprises a governor.

12. The air conditioning system of claim 1, wherein said condenser comprises a condenser fan, further comprising means for controlling a rotational speed of said condenser fan, wherein when said temperature of said inverter is greater than said first predetermined temperature, said means for controlling said rotational speed of said condenser fan increases said rotational speed of said condenser fan.

13. The air conditioning system of claim 12, wherein said means for controlling said rotational speed of said condenser fan comprises a governor.

14. An air conditioning system comprising:

a refrigerant circuit, wherein said refrigerant circuit comprises:

a compressor for receiving a refrigerant gas and for compressing said refrigerant gas;

a condenser for condensing at least a portion of said compressed refrigerant gas into a liquid refrigerant;

an expansion valve for reducing a pressure of said condensed liquid refrigerant; and an evaporator for evaporating said condensed liquid refrigerant, wherein said compressor is driven by an electric motor and said electric motor controls a rotational speed of said compressor by an inverter, wherein a temperature of said inverter is decreased by said evaporated refrigerant and said inverter is formed integrally with said compressor;

means for determining whether a temperature of said inverter is greater than a first predetermined temperature; and means for controlling a rotational speed of said compressor, such that when said temperature of said inverter is greater than said first predetermined temperature, said means for controlling said rotational speed of said compressor decreases said rotational speed of said compressor.

15. The air conditioning system of claim 14, further comprising means for stopping a rotation of said compressor when said temperature of said inverter is greater than a second predetermined temperature, wherein said second predetermined temperature is greater than said first predetermined temperature.

16. The air conditioning system of claim 14, wherein when after an activation of said compressor said temperature of said inverter is greater than said first predetermined temperature, said means for controlling substantially maintains said rotational speed of said compressor at an activation rotational speed, wherein rotating said compressor at said activation rotational speed decreases said temperature of said inverter below said first predetermined temperature.

17. The air conditioning system of claim 14, further comprising means for detecting a suction pressure of said compressor, wherein when a calculated temperature of said inverter is greater than a third predetermined temperature, said means for controlling said rotational speed of said compressor decreases said rotational speed of said compressor.

18. The air conditioning system of claim 14, further comprising means for controlling an volume of air passing through said evaporator, wherein when said temperature of said inverter is greater than said first predetermined temperature, said means for controlling said volume of air passing through said evaporator decreases said volume of air passing through said evaporator.

19. The air conditioning apparatus of claim 14, further comprising means for adjusting a size of an opening of said expansion valve, wherein when said temperature of said inverter is greater than said first predetermined temperature, said means for adjusting said size of said opening increases said size of said opening.

20. The air conditioning system of claim 14, wherein said condenser comprises a condenser fan, further comprising means for controlling a rotational speed of said condenser fan, wherein when said temperature of said inverter is greater than said first predetermined temperature, said means for controlling said rotational speed of said condenser fan increases said rotational speed of said condenser fan.

21. The air conditioning system of claim 14, wherein said means for stopping a rotation of said compressor when said temperature of said inverter is greater than said second predetermined temperature and said means for controlling a rotational speed of said compressor are formed integrally with said inverter.

22. A method of employing an air conditioning system comprising a compressor for receiving a refrigerant gas and for compressing said refrigerant gas, a condenser for condensing at least a portion of said compressed refrigerant gas into a liquid refrigerant, an expansion valve for reducing a pressure of said condensed liquid refrigerant, and an evaporator for evaporating said condensed liquid refrigerant, wherein said compressor is driven by an electric motor and said electric motor controls a rotational speed of said compressor by an inverter, comprising the steps of:

determining whether a temperature of said inverter is greater than a first predetermined temperature; and decreasing a rotational speed of said compressor when said temperature of said inverter is greater than said first predetermined temperature.

23. The method of claim 22, further comprising the step of stopping a rotation of said compressor when said temperature of said inverter is greater than a second predetermined temperature, wherein said second predetermined temperature is greater than said first predetermined temperature.

24. The method of claim 22, further comprising the step of decreasing a volume of air passing through said evaporator when said temperature of said inverter is greater than said first predetermined temperature.

25. The method of claim 22, further comprising the step of increasing a size of an opening of said expansion valve when said temperature of said inverter is greater than said first predetermined temperature.

26. The method of claim 22, wherein said condenser comprises a condenser fan, further comprising the step of increasing a rotational speed of said condenser fan when said temperature of said inverter is greater than said first predetermined temperature.

* * * * *